(12) United States Patent
Sugumar et al.

(10) Patent No.: US 7,849,286 B2
(45) Date of Patent: Dec. 7, 2010

(54) METHOD FOR DYNAMIC LOAD BALANCING ON PARTITIONED SYSTEMS

(75) Inventors: Suresh Sugumar, Kerala (IN); Kiran Panesar, Karmataka (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/694,017

(22) Filed: Jan. 26, 2010

(65) Prior Publication Data

US 2010/0125845 A1   May 20, 2010

Related U.S. Application Data

(62) Division of application No. 11/648,497, filed on Dec. 29, 2006, now Pat. No. 7,673,113.

(51) Int. Cl.
    *G06F 12/00* (2006.01)
(52) U.S. Cl. .................. 711/173; 711/208; 711/112
(58) Field of Classification Search ............. 711/112, 711/103, 170, 165, 201, 208, 200, 209, 206, 711/173, 6; 703/13
    See application file for complete search history.

(56) References Cited

U.S. PATENT DOCUMENTS

| | | | |
|---|---|---|---|
| 5,255,379 A * | 10/1993 | Melo | ............. 711/202 |
| 6,698,017 B1 | 2/2004 | Adamovits et al. | |
| 7,257,811 B2 | 8/2007 | Hunt et al. | |
| 2003/0037224 A1 | 2/2003 | Oehler et al. | |
| 2006/0230407 A1 | 10/2006 | Rosu et al. | |
| 2007/0180449 A1 | 8/2007 | Croft et al. | |
| 2007/0204265 A1 | 8/2007 | Oshins | |
| 2007/0226795 A1 * | 9/2007 | Conti et al. | ............. 726/22 |
| 2008/0162864 A1 | 7/2008 | Sugumar et al. | |
| 2008/0244598 A1 | 10/2008 | Tolopka et al. | |

OTHER PUBLICATIONS

Non-Final Office Action for U.S. Appl. No. 11/648,497, Mailed Apr. 13, 2009, whole document.
Final Office Action for U.S. Appl. No. 11/648,497, Mailed Sep. 4, 2009, whole document.
Notice of Allowance for U.S. Appl. No. 11/648,497, Mailed Oct. 13, 2009, whole document.
Clark, Christopher, et al., "Live Migration of Virtual Machines," http://www.cl.cam.ac.uk/research/srg/netos/papers/2005-migration-nsdi-pre.pdf, accessed & printed Dec. 28, 2006, 14 pgs.

* cited by examiner

*Primary Examiner*—Pierre-Michel Bataille
(74) *Attorney, Agent, or Firm*—Blakely, Sokoloff, Taylor & Zafman LLP

(57) ABSTRACT

Methods, systems and apparatuses to dynamically balance execution loads on a partitioned system among processor cores or among partitions.

20 Claims, 7 Drawing Sheets

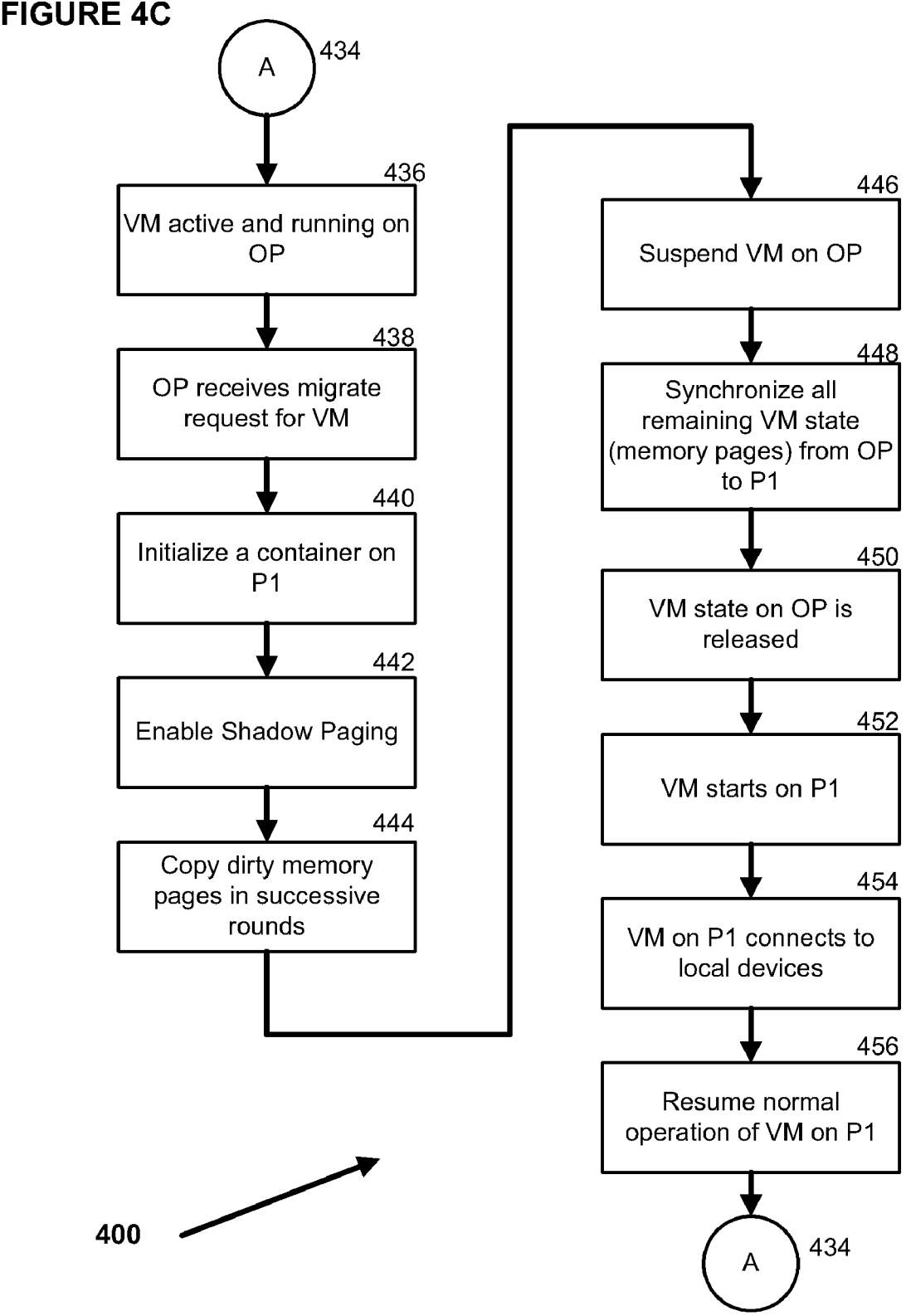

METHOD FOR DYNAMIC LOAD BALANCING ON PARTITIONED SYSTEMS

CROSS REFERENCE TO RELATED APPLICATIONS

This application is a division of and claims the benefit of priority to U.S. application Ser. No. 11/648,497, filed on Dec. 29, 2006, entitled "METHOD FOR DYNAMIC LOAD BALANCING ON PARTITIONED SYSTEMS."

TECHNICAL FIELD

This invention relates to the field of virtualization and partitioning, and more particularly, to a system, method, and apparatus for balancing utilization levels in a computer system with multiple partitions or processing cores.

BACKGROUND

Historically, computer systems have employed the use of partitioning and virtualization to divide up limited system resources among the simultaneous needs of multiple users, multiple applications, multiple operating systems, or a combination of the above. Dividing up system resources into multiple partitions or virtual machines ("VMs") allows for autonomy between the partitions and VMs, and further provides additional flexibility on a single host allowing multiple simultaneous instances of otherwise incompatible operating systems or applications. Another common use of VMs, historically employed, has been to aggregate multiple computing environments on a single instance of a physical computer. Doing so is relatively inexpensive compared with multiple hosts of equivalent processing power. Such an approach is also known as "computer consolidation." Computer consolidation may also be employed to increase the overall computer system availability through redundancy of computer hardware.

FIG. 1 illustrates a prior art apparatus 100 with a user partition 105 and a system partition 110. The user partition 105 includes user resources 185, and two processor cores 175 and 180. The system partition includes processor core 190 and system resources 186. The system partition 110 and user partition 105 communicate with each other via a communication channel 120. The system partition 110 has a corresponding operating system ("OS") 125 which supports system applications 130, both of which execute utilizing the processor core 190 and resources 186 contained within the system partition 110. The user partition 105 has a corresponding virtual machine monitor ("VMM") 135, and manages two virtual machines ("VMs") 140 and 165 running on processor cores 175 and 180. Each VM 140 and 165 runs a corresponding operating system, 145 and 160 respectively. The operating systems 145 and 160, support user applications 150 and 155.

The prior art computing apparatus 100 has no means to balance the utilization levels between the user partition 105 and the system partition 110. Furthermore, the system partition 110 has no VMM to support the execution of one or more VMs. The user partition 105, while having a VMM 135 and VMs 140 and 165, has no means to balance the execution between an overloaded processor core 175 or 180 in the user partition 105 with an underutilized processor core 190 in the system partition 110, nor can it balance the execution load between the system partition 110 and the user partition 105.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the Figures of the accompanying drawings. It should be noted that references to "an" or "one" embodiment in this disclosure are not necessarily to the same embodiment, and such references mean at least one.

FIG. 4C illustrates a flowchart depicting a pull migration of a VM to an underutilized partition according to one embodiment of the invention.

DETAILED DESCRIPTION

Figure 1:
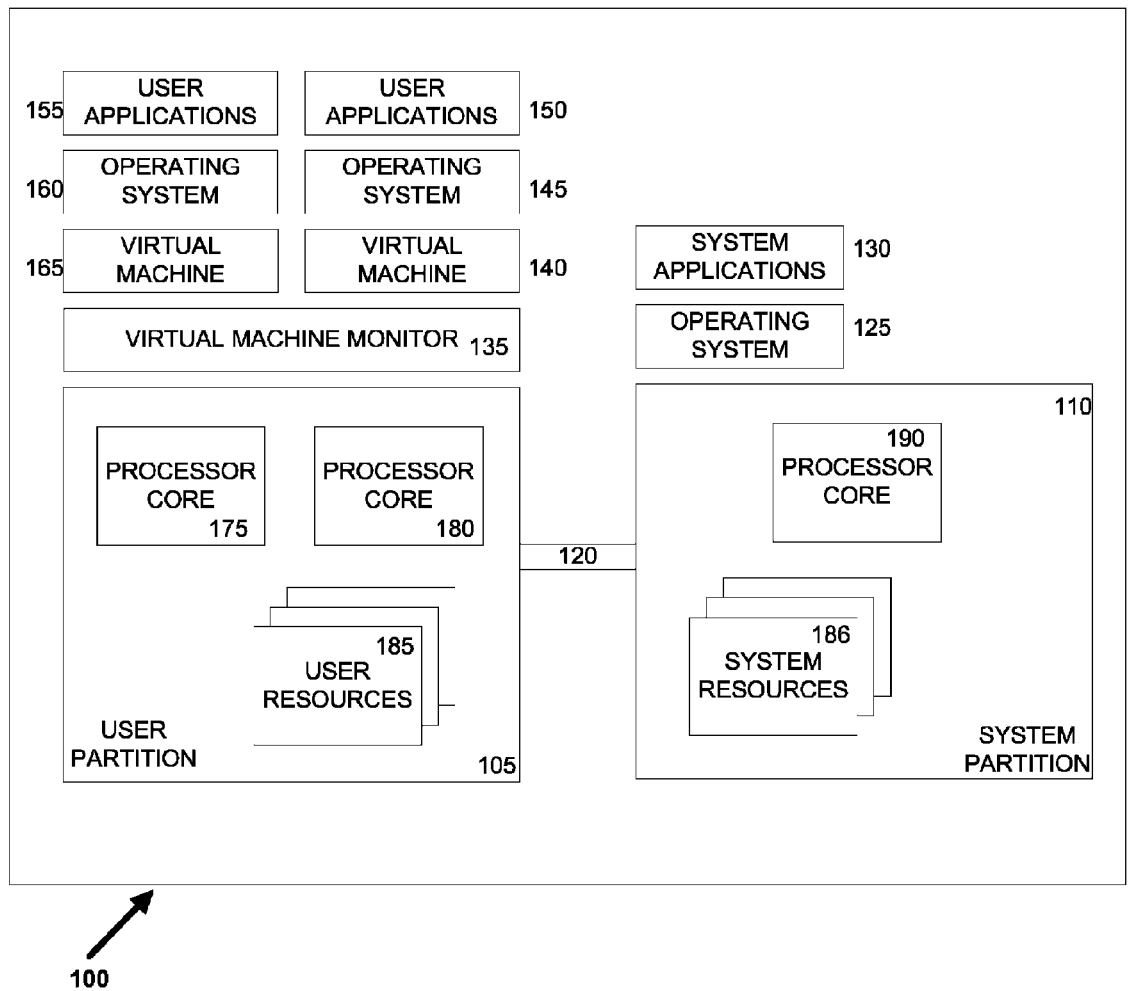
FIG. 1 illustrates a prior art apparatus with a user partition and a system partition, each with assigned resources and one or more processor cores to execute applications.

The partitioned system described herein can recognize execution loads on particular processor cores or on entire partitions within the system, determine if the system is operating in a state of imbalance, and automatically execute computer instructions to dynamically bring the system into a more balanced state.

The simplest example is that of a system with two partitions. A first partition operates as a user partition, and a second partition operates as a system partition. The user partition includes a processor core and user resources and further includes two virtual machines ("VMs") executing on the processor core allocated to the user partition. Similarly, the system partition includes a processor core and system resources, and further includes two VMs executing on the processor core assigned to the system partition. Each partition is managed by a virtual machine monitor ("VMM"), in this case there are two. A first VMM manages the activities of the user partition, and a second VMM manages the activities of the system partition. The two virtual machine monitors ("VMMs") are able to communicate with one another for the purpose of: gathering information about the other partition, utilizing the resources of the other partition, or facilitating the migration of VMs between the partitions.

At runtime, it is common for the demands on a system to fluctuate. In a non-partitioned system, this is not a problem because all of the system's resources are available to the task or tasks at hand. Even if a non-partitioned system is operating in a state of high utilization, say 100%, it is still operating as efficiently as possible because all of its resources are working to complete the required task. In a multi-partition system however, it is likely that one partition will have a heavier load than another partition. For example, in the system described above with a user partition and a system partition, for the sake of illustration, a first virtual machine ("VM") in the user partition is executing an encoded video file, say an MPEG (moving picture experts group) formatted file on the user partition's first VM. Decoding this file for display takes large amounts of processing power, thus creating a large load on the user partition and its processor core. The user partition's second VM is executing a web browser which is downloading a very large audio file. The user partition's second VM has a very small execution load as the web browser is essentially idle, and the downloading of the audio file is progressing at a slow rate of speed due to the high network demand for this particular audio file. Despite the user partition's second VM having a small load however, the user partition as a whole is overutilized, which is degrading the performance of the user partition's second VM and thus the audio file download is negatively impacted. Meanwhile, the system, which is configured with fault tolerance, has a system partition with a primary purpose of data recovery. The system partition's first VM is monitoring the system hard drives for errors, which creates a very small execution load. The system partition's second VM is waiting to be notified of hard drive errors by the system partition's first VM, at which point it will perform data recovery tasks to maintain the overall health of the system. Because there are no hard drive errors occurring, the system partition's second VM is idle with zero load. This system, in its current state, is out of balance in terms of its utilization of the two available processor cores. This imbalance is causing a second negative effect of a thermal imbalance wherein the processor core in the user partition is executing at a very high temperature and the processor core in the system partition is executing at a relatively low temperature.

The VMMs operating on the system 200 recognize this utilization imbalance, and take action to bring the system into a more balanced state. The VMMs first determine the load status (utilization level) of the partitions and then dynamically migrate a VM to bring the system into a more balanced state. In this case, the user partition's second VM (which is executing the web browser and downloading an audio file), is migrated to the system partition for further execution as the system partition's now third VM. Doing so allows the decoding of the video file executing in the user partition's first, and now only, VM to execute faster, and allows the audio file download, now executing in the system partition's third VM, to execute faster, bringing the system into a more balanced state, thus running more efficiently. The thermal distribution among the processor cores in the system is also brought further into equilibrium due to the more balanced execution loads.

Figure 2:
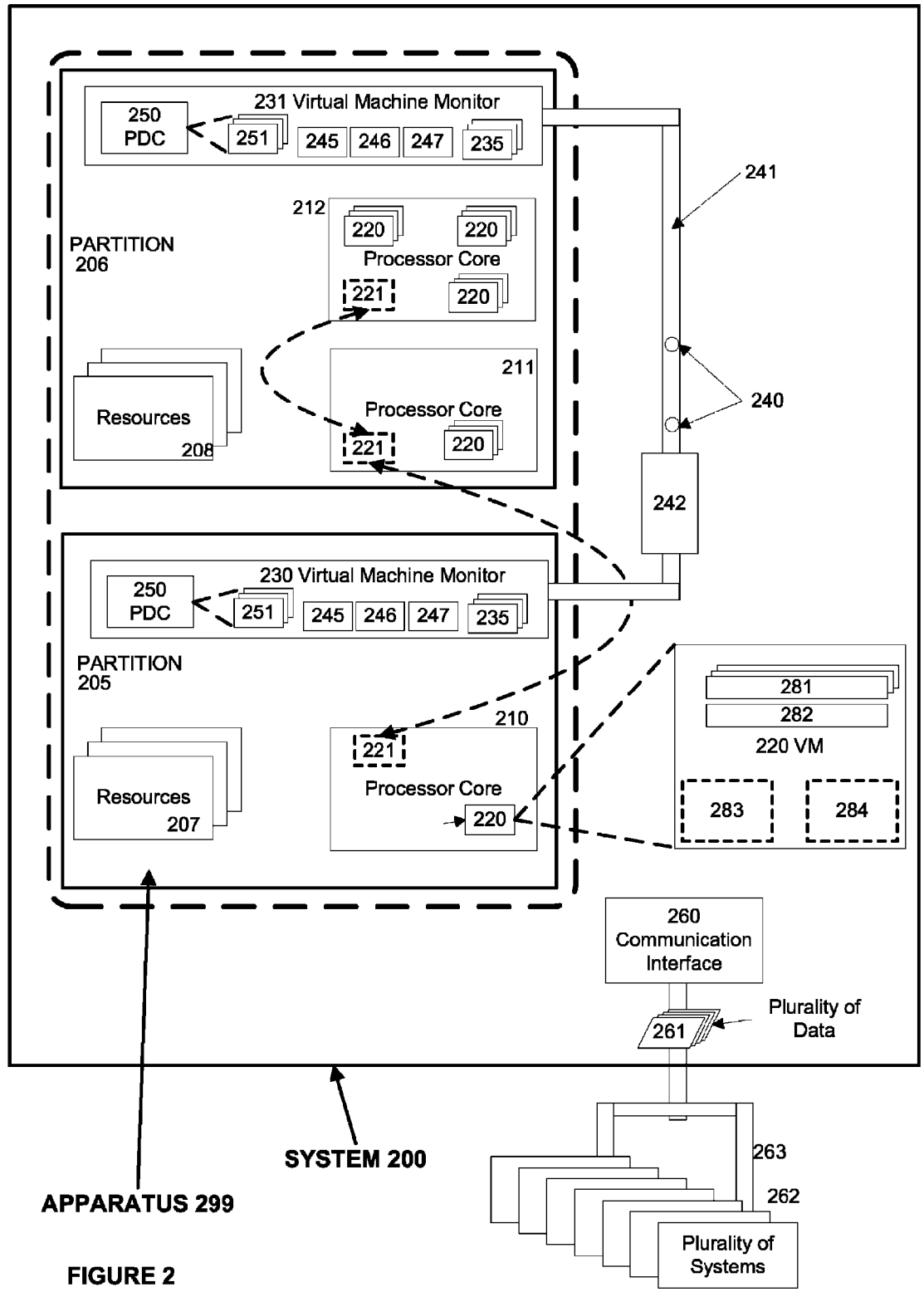
FIG. 2 illustrates an apparatus and a system for dynamically balancing the utilization levels of multiple processor cores or partitions according to one embodiment of the invention.
Figure 3:
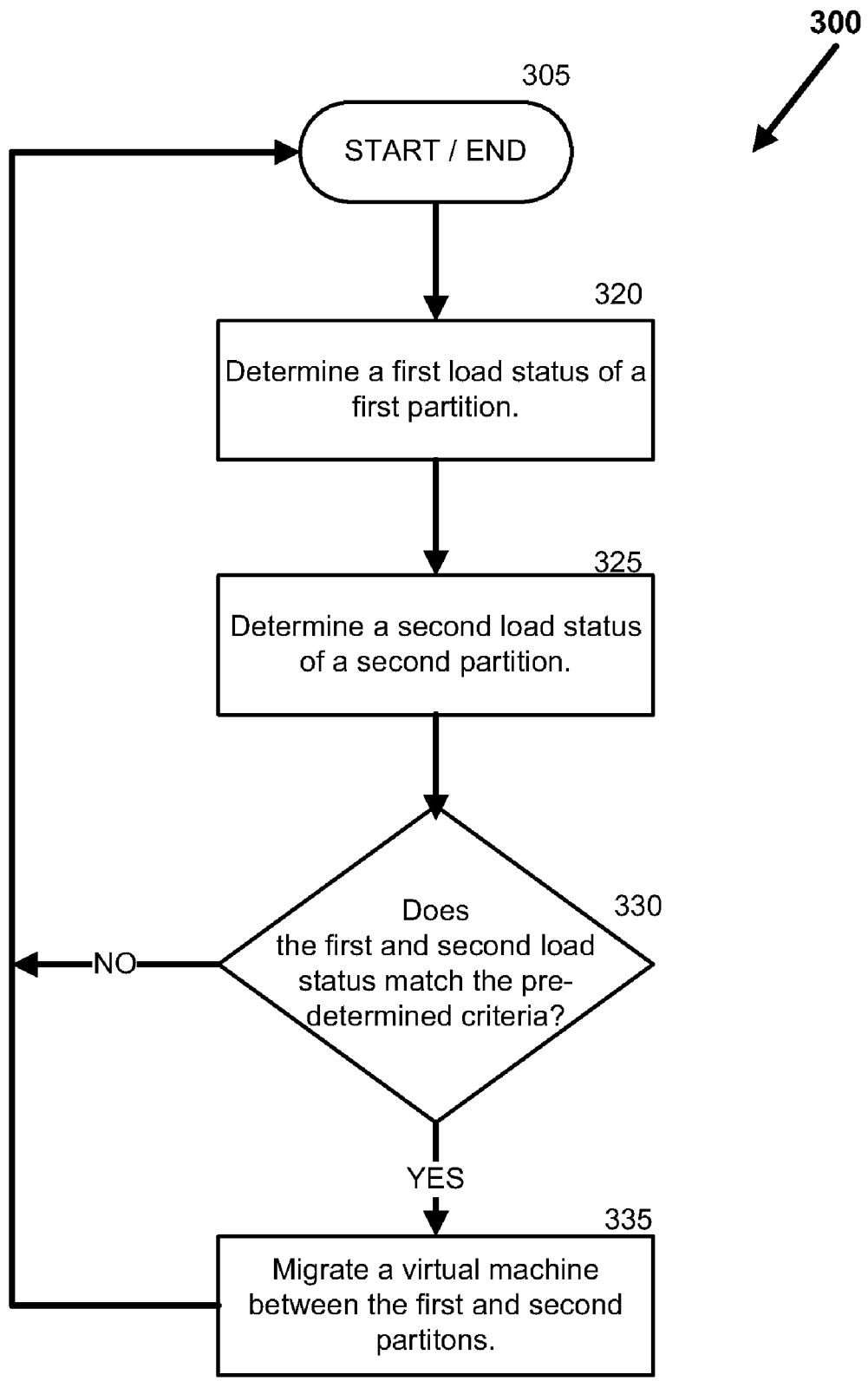
FIG. 3 illustrates a flowchart depicting a method determining partition utilization levels, and migrating a VM between two partitions.
Figure 4A:
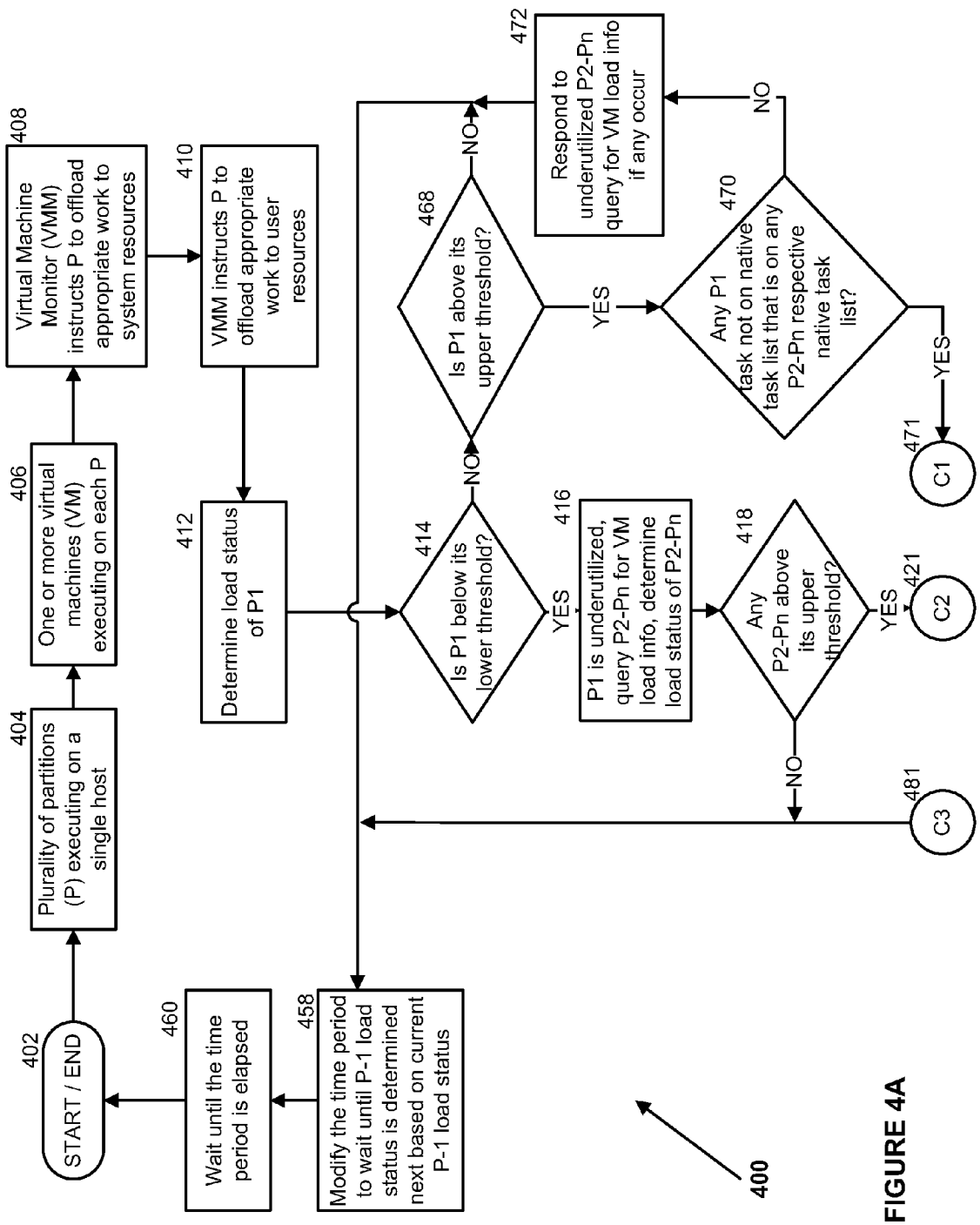
FIGS. 4A and 4B illustrate a flowchart depicting additional optional steps of a method to determine partition utilization levels, select, and then migrate a VM from one partition to another according to an embodiment of the invention.
Figure 4B:
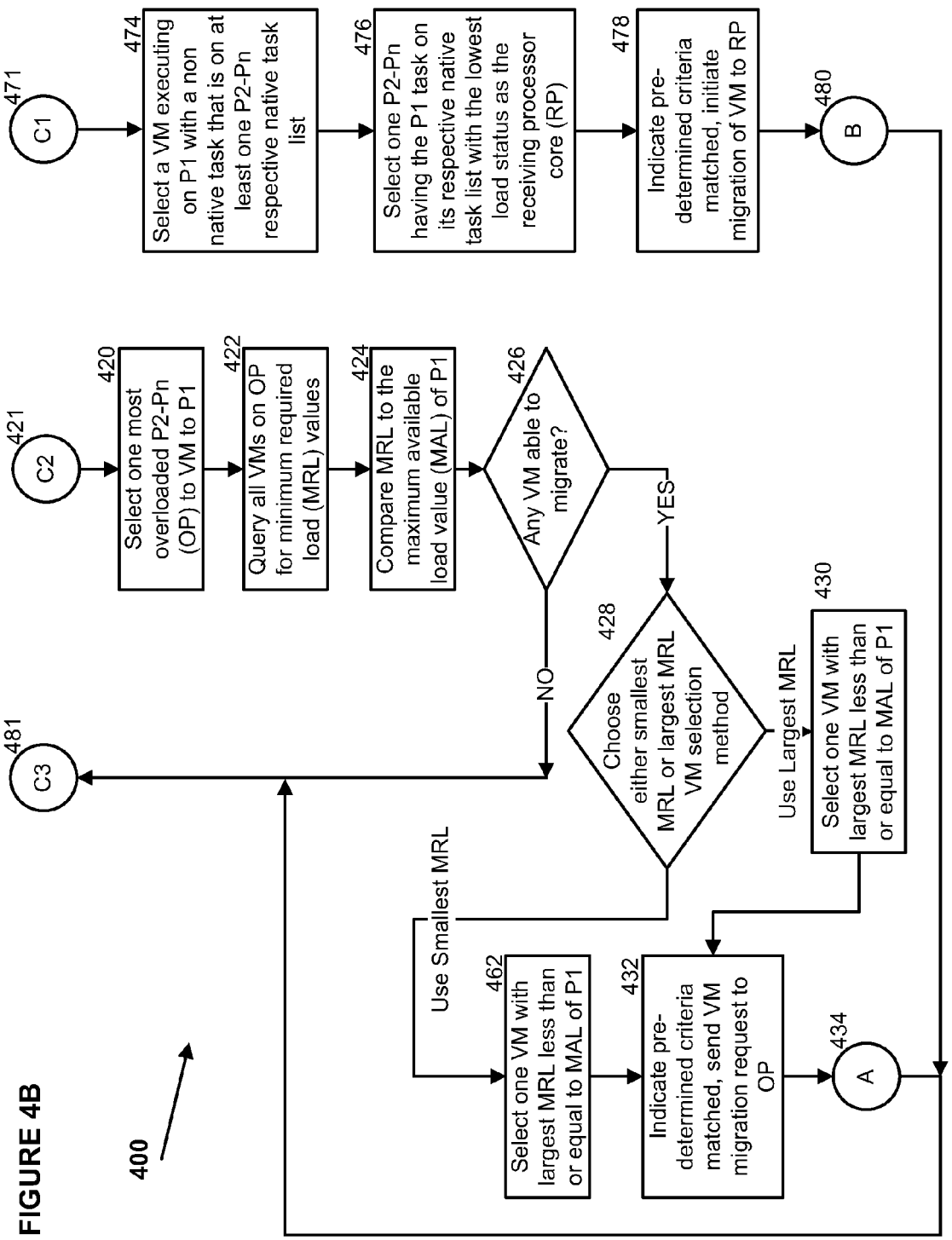
Figure 4D:
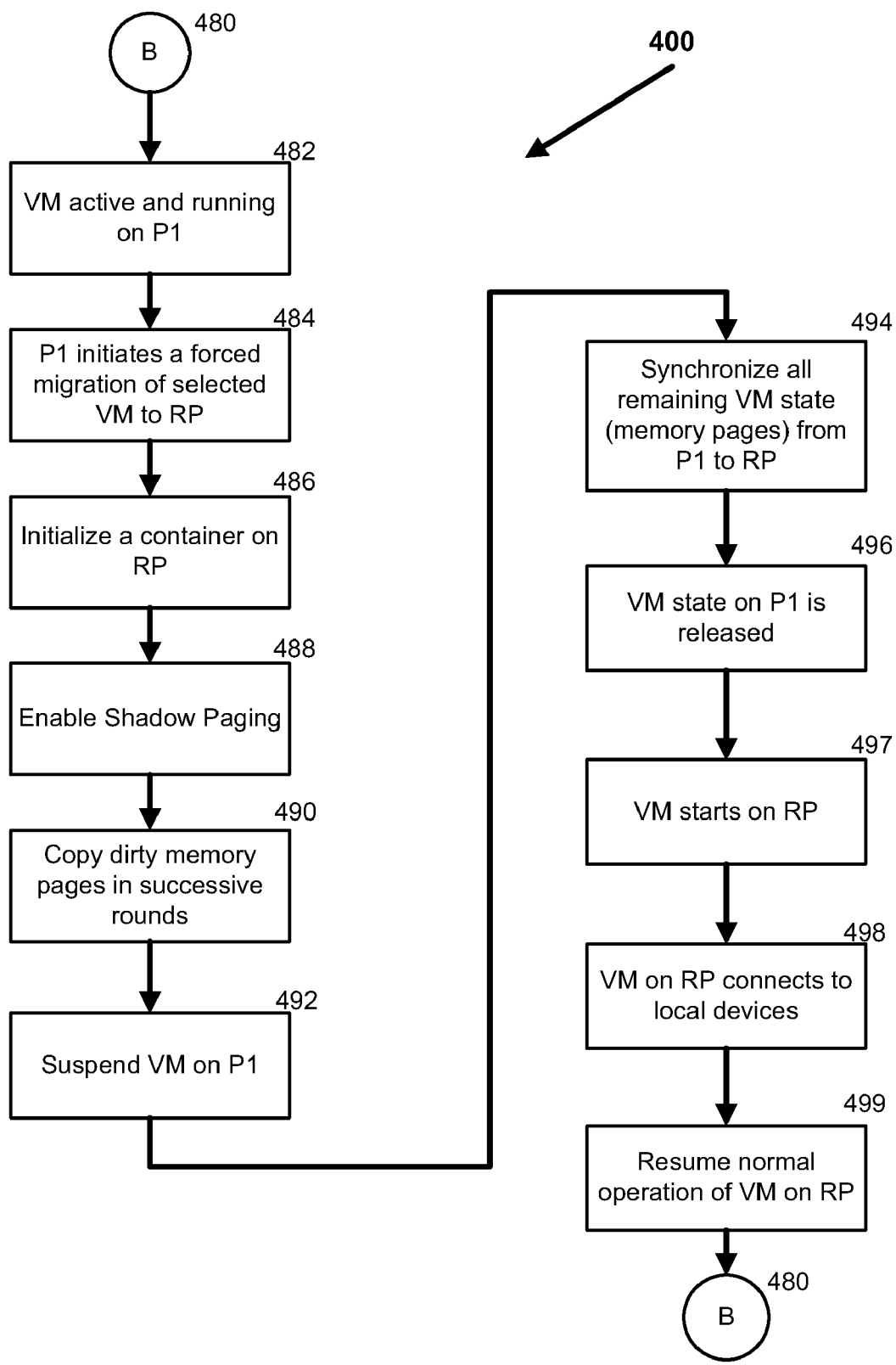
FIG. 4D illustrates a flowchart depicting a push migration of a VM from an overutilized partition in accordance with an embodiment of the invention.

Refer now to FIGS. 2, 3, 4A, 4B, 4C, and 4D: FIG. 2 illustrates a system 200 including apparatus 299 for dynamically balancing the utilization levels of partitions 205-206 according to one embodiment of the invention. FIG. 3 illustrates a flowchart 300 depicting a method determining partition utilization levels 320-325, and migrating a VM 220-221 between two partitions 205,206 (step 335). FIGS. 4A, 4B, 4C, and 4D illustrate a flowchart 400 depicting additional optional steps of a method to determine partition 205 utilization levels (steps 414 and 418), select, and then migrate a VM 220-221 from one partition 206 to another according to an embodiment of the invention. FIG. 4C illustrates that portion of flowchart 400 depicting a pull migration of a VM 220-221 to an underutilized partition 206 according to one embodiment of the invention. Lastly, FIG. 4D illustrates that portion of flowchart 400 depicting a push migration of a VM 220-221 from an overutilized partition 206 in accordance with an embodiment of the invention.

With reference to FIG. 2 specifically, a first partition 205, and a second partition 206 are incorporated into the apparatus 299, which in turn is incorporated into system 200. Each partition 205 and 206 includes one or more processor cores. Partition 205 includes processor core 210, and partition 206 includes processor cores 211 and 212. Each partition 206 in the apparatus 299 includes one or more VMs 220-221. Processor core 210 shows VM 220, and also VM 221, whose hashed border and hashed arrow connected with corresponding VM 221 in processor core 211 is intended to depict a VM that is migrating. Thus, VM 221 is migrating between partition 205 and partition 206. Processor core 211 internal to partition 206 shows a plurality of VMs 220 in addition to the migrating VM 221; likewise, processor core 212 shows a plurality of VMs 220 and a migrating VM 221 which corresponds to migrating VM 221 in processor core 211. The hashed arrow connecting migrating VM 221 in processor cores 211 and 212 is intended to depict a VM 221 migrating between processor cores 211 and 212, within partition 206.

Each partition 205 and 206 is connected with a VMM 230-231. VMM 230 is connected with partition 205, and manages the VMs 220-221 that are executing on the processor core 210 internal to the VMM's 230 respective partition 205. In the same manner, VMM 231 is connected with partition 206, and manages the VMs 220-221 that are executing on the processor cores 211-212 internal to the VMM's 231 respective partition 206.

Each of the VMMs 230-231 also generate computer instructions 235 for execution by the plurality of VMs 220-221. The VMMs 230-231 pass data 240 between themselves via a communication channel 241. The communication channel 241 includes a memory component 242 to facilitate the transfer of data 240 between the VMMs 230-231.

With reference to FIGS. 2, 3, 4A, 4B, 4C, and 4D, system 200 has processor cores 210-212 executing on a single host (step 404), and one or more VMs 220-221 executing on partition 206 (step 406). Periodically, a first computer instruction 235 is executed to determine the load status 245 of partition 205 (step 320 and step 412), and then a second computer instruction 235 is executed to determine the load status 246 of partition 206 (step 325 and 416). VMM 230 compares the load status 245 of partition 205 against pre-determined criteria 250 determining if partition 205 is currently underutilized (step 414); and compares the load status 246 of partition 206 against the pre-determined criteria 250 determining if partition 206 is currently overutilized (step 418). If both comparisons are true (partition 205 is underutilized and partition 206 is overutilized), then the pre-determined criteria 250 has been matched (step 330 and step 432) and the VMM 230 next executes a third computer instruction 235 selecting and migrating VM 221 from partition 206 over to partition 205 for execution on processor core 210 (step 335 then returning to step 305 of FIG. 3, and steps 434-456 of FIG. 4C returning to step 402 of FIG. 4A). If instead, either comparison is not true (partition 205 is not underutilized or partition 206 is not overutilized), then the pre-determined criteria 250 has not been matched (step 330) and no action is taken (return to step 305 of FIG. 3 and 402 of FIG. 4A). The VMM 230 waits a period of time before executing computer instructions 235 again (step 460). VMM 231 performs a similar process.

System 200 further comprises a communication interface 260 to transmit a plurality of data 261 between the system 200 and a plurality of other systems 262 connected with the communication interface 260 via a network 263.

Referring now to FIG. 2, a partition 205-206 may comprise any portion of an apparatus 299 or system 200 resources. Resources may be allocated or assigned to any number of partitions 205-206, wherein there is no overlap of resources (or double assignment of the same resource) between two partitions 205-206. One partition 205 may indirectly control resources allocated to a second partition 206, by commanding a process of the second partition 206 to directly operate on the resources. A partition 205-206 may comprise any whole number of processor cores 210-212. A partition which has been newly created, but has no processor cores 210-212 assigned may exist with zero processor cores 210-212. A partition 205-206 may comprise up to 100% of the processor cores 210-212 in a system 200. A system 200 may comprise as few as two partitions 205-206. In one embodiment, a system 200 has two processor cores 210 and 211 and two partitions 205-206, each comprising one of the processor cores 210 and 211.

A partition 205-206 may consist of only a single processor core 210-212 that has a portion of the system's 200 executing tasks assigned to it if there is at least one more partition 205-206 with at least a single processor core 210-212 that has a second portion of the system's 200 executing tasks assigned. For example in an embodiment in accordance with the invention a system 200 has only two processor cores 210-212, and a single VMM 230. Partition 206 includes two VMs 220-221 executing thereon. VMM 230 determines the load status 245 of the first partition by executing a first computer instruction 235, determines the load status 246 of the second partition by executing a second computer instruction 235, compares the resulting load statuses 245-246 to the pre-determined criteria 250, and then migrates VM 221 between the two partitions.

A partition 205-206 may be void of processor cores with only a portion of the system's 200 hardware resources assigned to it, or a partition 205-206 may have one or more processor cores 210-212 assigned and one or more resources assigned.

Partitions 205-206 may be assigned to a particular task or function, or classified to run specific types of tasks. One or more partitions 205-206 may be comprised of "system partitions," sometimes also referred to as "embedded partitions." System partitions are assigned, allocated, or designed to do some specific task or group of tasks, initiated by the system 200 itself, on behalf of an end-user, rather than by an end-user directly, or indirectly initiated by an end user. For example, in a particular embodiment, one or more system partitions perform functions such as data encryption, data decryption, fault recovery, fault isolation, fault monitoring, RAID (redundant array of inexpensive disks) recovery, services to monitor and manage the state of the system 200, console access to the system 200 via the network 263, packet filtering to a network interface, wireless radio aggregation, fault prediction, and 3-D (third dimensional) graphical rendering. System partitions may be any type of task or functionality operating as a value add service for the system 200 or apparatus 299. The functionality of a system partition may improve the overall computing power or the perceived "speed" at which the system 200 operates. In another embodiment, the functionality of a system partition occurs out of the direct view of a user, and operates by offloading work from another partition so as to provide the same service without diminishing the user's perception of overall system 200 speed and to improve the user's perception of overall system 200 speed.

Partitions 205-206 may also be classified as "user partitions," sometimes also known as "legacy partitions." A user partition may be assigned, allocated, or designed to perform general tasks initiated by an end-user directly. User partitions may perform tasks also performed by a system partition, or another class of partition, just as system partitions or other classes of partitions may perform tasks also performed by a user partition.

In one embodiment, one or more user partitions perform tasks such as video games, video game servers, word processors, spread sheets, personal finance applications, electronic calendars, web browsers, digital music players, digital video players, network monitor interfaces, graphical user interfaces, source code compilers, system configuration utilities, email interfaces, operating systems (such as Windows, UNIX, Linux, BSD, OS WARP, DOS, etc.), or any other function, task, or application desired to be run by an end-user. A user partition may be the primary source of computation power on a system 200 that an end-user has direct control over to execute general tasks and applications.

A processor core 210-212 is sometimes referred to as a "processor," or "processing core," or "semi-conductor device," or "central processing unit (CPU)," or "micro-processor," or a "computer chip." A processor core 210-212 may be an independent micro-processor, whether it be a single core integrated circuit ("IC"), a dual-core IC, a twin-core IC, a quad-core IC, or any other variation of a multi-core or multi-threaded IC. A processor core 210-212 may also be a collection of independent micro-processors that constitute a single multi-core semi-conductor device. For example, in one embodiment of the invention, a system 200 comprises one physical dual-core IC 210-212. The one physical dual-core IC 210-212 comprises two independent micro-processors. A first independent micro-processor is assigned to a first partition 205, and a second independent micro-processor is assigned to a second partition 206. The first and second independent micro-processors each comprise two VMs 220-221. VMM 230 migrates VM 221 from the first independent micro-processor allocated to the first partition 205, to the second independent micro-processor allocated to the second partition 206. In an alternate embodiment, a first partition 205 comprises a first processor core 210, wherein the first processor core comprises a dual-core IC, and a second partition 206 comprises a second processor core 211, wherein the second processor core comprises a multi-core IC. Each partition further comprises two VMs 220-221 executing thereon. VMM 230 migrates VM 221 from the second partition 206 to the first partition 205 for execution on the dual core IC.

With reference now to FIGS. 2, 4A and 4B, additional resources 207-208 may be included in a system 200 or apparatus 299, and assigned, or allocated to a particular partition 205-206. Resources, may be classified as "user resources" (also known as "legacy resources"), or as "system resources" (also known as "embedded resources"). Other types of classification are possible, but classification is altogether optional. In one embodiment, resources 207-208 are employed to offload tasks or execution work from a processor core 210-212 or partition 205-206 (steps 408 and 410). User resources 207-208 may include any type of functionality that a user employs for applications 281 that the user wishes to execute on the system 200. Specific examples of user resources 207-208 are: a hard disk drive and its interface, a video processing card and its interface, a network interface, and a sound card, etc. Processor cores, memory, and other components are likewise resources, and may also be considered system resources or user resources depending on their use in a system 200. Some specific examples of common system resources 207-208 are: data encryption and decryption hardware, a "service processor" or equivalent device that monitors or manages the state of the computer system, packet filtering hardware, wireless radio aggregation chips, and hardware RAID (redundant array of inexpensive disks) devices, etc. There is a vast array of functionality and components that may be employed as system or user resources 207-208, some of which may overlap. A System resource 207-208 however, is generally functionality or a hardware device that allows for the offloading of tasks that occur out of the direct view of an end-user, while a user resource 207-208, is generally functionality or hardware that offloads execution tasks which are being run by an application in the direct control of an end-user.

Referring now to FIGS. 2, 4A, and 4B: A VM 220-221 is often referred to as a "virtual machine." A system 200 that supports the execution of VMs 220-221 is said to support "virtualization." A processor core 210-212 may comprise any whole number of VMs. A processor core 210-212 will usually comprise only as many VMs 220-221 as it can execute without its utilization exceeding an upper threshold defined in the pre-determined criteria 250. A processor core 210-212 may however, execute a number of VMs 220-221 that causes its utilization to exceed an upper threshold (step 468) defined in the pre-determined criteria 250, or exceed the processor core's maximum execution capacity, possibly resulting in degraded performance for each VM 220-221 executing on the processor core 210-212. Conversely, a processor core may execute so few VMs that the processor core's 210-212 utilization falls below a threshold (step 414) defined in the pre-determined criteria 250. Each VM has a corresponding load which represents the amount of work it is currently responsible for. This work may be in the form of tasks or functionality. The load of a VM may be represented as a value, which may be any whole or fractional number. A VM that is idle, may have tasks assigned to it and still have a load of zero. A VM 220-221 may be assigned to execute on a specific processor core 210-212 or to execute within a specific partition 205-206.

Referring now to FIG. 2: A VM 220-221 may comprise an OS 282 (e.g. Windows, Unix, Linux, DOS, BSD, etc.). For example, in one embodiment, a VM 220-221 is executing on a first partition. The VM 220-221 comprises an instance of the Windows XP Professional™ operating system. The VM 220-221 is then migrated from the first partition 205-206 to a second partition 205-206 dynamically.

A VM 220-221 may include one or more applications 238. For example, in another embodiment a VM 220-221 is executing on a first partition. The VM 220-221 comprises an instance of the Solaris™ OS 282 and a connected online FTP (file transfer protocol) application 281. The VM 220-221 is then migrated from the first partition to a second partition at run-time where it continues execution without having to reconnect its online application 281 to the internet or restart any file transfer that is currently in process.

A VM 220-221 may include an application fault 283 or an OS fault 284. Both application faults and OS faults are sometimes referred to as "bugs," or "failures," or "defects," or "errors," or "hangs," or "crashes." An application fault or OS fault may be any error message or unexpected behavior that results from the execution of an application, or any abnormal condition or defect at the component, equipment, or subsystem level which may lead to a failure.

For example, in a particular embodiment of the invention, a first VM 220-221 and a second VM 220-221 are executing on a first partition. The first VM 220-221 comprises an instance of an OS 282 and a connected online video game application 281. The application 281 is an unauthorized port that contains a malicious virus. The malicious virus overwrites a portion of physical memory allocated to the OS 282. The application 281 then throws a memory read error and the application faults 283. The OS 282 runs as normal for a period of time, but then reads from the physical memory overwritten by the malicious virus, causing the OS 282 to throw a memory corruption error, which in turn causes the OS 282 to panic, resulting in an OS fault 284. A first VMM 230 quarantines the application fault 283 and the OS fault 284 to the first VM 220-221 thus preventing any negative impact to the second VM 220-221. The first VMM 230 then reboots the first VM 220-221 without negatively impacting any other part of the system 200.

A VM 220-221 may migrate to a system partition or to a user partition, or to a partition of another type. For example, in one embodiment, a VM 220-221 migrates from a system partition to a user partition. In another embodiment, a VM 220-221 migrates from a user partition to a system partition. In a particular embodiment, a VM 220-221 migrates from a first user partition to a second user partition. In an alternative embodiment, a VM 220-221 migrates from a first system partition to a second system partition.

A VM 220-221 that migrates may be referred to as "migrating live," or "live migration," or "dynamic migration," or "migration." A VM 220-221 that migrates does not require rebooting, reloading of currently executing operating systems 282 or applications 281, reconnecting of online applications 281, or reloading of configuration parameters, because the VM's 220-221 memory pages and entire "state" are copied from a first partition to a second partition. For example, in one embodiment, a first VM 221 migrates from a first partition 206 to a second partition 205 without rebooting or reconnecting its online applications 281 that are currently executing.

Referring now to FIGS. 2, 4A, 4B, 4C, and 4D: There are various ways in which a VM 220-221 may migrate to an alternate partition 205-206 or processor core 210-212. For example, in one embodiment in accordance with the present invention, a VM 221 is "pulled" or "received" by a target partition 205-206 or processor core 210-212 from a sending partition 205-206 or processor core 210-212 (steps 432-456). At step 432, a first VMM 230 indicates that pre-determined criteria 250 has been matched, and sends a VM migration request message (data 240) to a second VMM 231 which has control of a second processor core 211 selected to receive or pull VM 221. Step 436 in FIG. 4C indicates the VM 221 on the second processor core 211 is in a first state of "pre-migration," active and running on an overutilized processor core 211. In step 438, the second VMM 231 receives a VM migration request from the first VMM 230. At step 440, the VM to migrate 221 enters a second state of "reservation," wherein a newly initialized VM container 221 is created on the first processor core 210 corresponding to the active VM 221 executing on the second processor core. In step 442, the VM to migrate 221 enters a third state of "pre-copy," wherein shadow paging is enabled. At step 444, the second VMM 231 begins to copy dirty memory pages in successive rounds. In step 446, the VM to migrate 221 enters a fourth state of "stop and copy," wherein the VM to migrate 221 has its execution suspended on the overutilized second partition 206. Then, in step 448, the memory pages of the VM instance 221 are suspended on the second processor core 211 and synchronized with the VM instance 221 waiting on the first processor core 210 by copying all remaining dirty or re-dirtied memory pages over to the new instance of the VM 221 on the first processor core 210. In step 450, the VM to migrate 221 enters a fifth state of "commitment," wherein the original VM instance 221 currently suspended on the second processor core 211 is eliminated (released), and the newly initialized VM 221 executing on the first processor core 210 is then referred to as the VM to migrate 221. At step 452, the VM 221 enters a sixth state of "activation," wherein the VM 221 begins to initialize. In step 454, the VM 221 connects to local devices and resources 207, and finally at step 456, the VM 221 returns to a first state of "pre-migration," and resumes normal operation executing now on the first processor core 210.

In an alternative embodiment, a similar process is performed, except that a VM to migrate 221 is "pushed" or "forced" from an initial partition 205-206 or processor core 210-212 onto a target partition 205-206 or processor core 210-212 (illustrated in steps 480-499 in FIG. 4D) rather than "pulled" or "received."

Referring still to FIGS. 2, 4A, 4B, 4C, and 4D: The reasons or conditions under which a system 200 or apparatus 299 may migrate a VM 220-221 are also varied. A system may migrate a VM 220-221 to balance execution loads amongst multiple partitions 205-206 or amongst multiple processor cores 210-212 in a single partition or in multiple partitions 205-206, to improve thermal distribution throughout a system 200, to increase the available processing power for critical tasks, such as fault recovery, to increase an end-user's perception of system 200 speed by providing additional resource or execution power to user applications, such as a video game, or to isolate and free up a component (e.g. memory, CPU, etc.) for "hot-swapping." For example, in one embodiment, a partition 205-206 executing above a threshold (step 468) in the pre-determined criteria 250 needing to dedicate additional execution power to a critical task determines if any task executing on a first processor core 210 is not in that processor core's 210 native task list (step 470). If there are not any non-native tasks executing on the first processor core 210, then the processor core 210 or its VMM 230 instead responds to VM load query requests (step 472), if any, coming from other VMMs 230-231. If however, the first processor core 210 does have non-native tasks executing, then it, or its VMM 230, selects a VM 221 to push or force off (step 474), and selects a target processor core 211-212 or partition 206 to take over execution of the VM to migrate 221 (step 476).

VMM 230-231 is sometimes referred to as a "virtual machine monitor," or a "hypervisor." A VMM 230-231 manages one or more partitions 205-206 and presents a hardware machine interface. A system 200 may have as few as one VMM 230-231 or as many VMMs 230-231 as there are partitions on a system 200. A VMM 230-231 may be comprised within a system partition, or a user partition, or a dedicated partition whose primary purpose is to manage VMs 220-221 running on the system 200 and initiate load balancing actions. A system 200 may lack a dedicated VMM 230-231 and instead provide the functionality of a VMM 230-231 from within the system's 200 processor cores 210-212, or additional resources 207-208. VMM 230-231 is any entity, component, or functionality that manages the activities of a system's 200 VMs 220-221. VMM 230-231 retrieves computer instructions 235 and issues them for execution on a partition, on a particular processor core 210-212, or within a specific VM 220-221. VMM determines the utilization or load status of a given partition 205-206 or a subset of partitions on a system 200 or all of the partitions 205-206 on a system 200. VMM 230-231 sends, or receives data 240 between itself and other VMMs 230-231. A VMM facilitates a VM 220-221 executing in a first partition to utilize resources located in a second partition. A VMM dynamically migrates VMs 220-221 between multiple partitions or processor cores which may reduce a system's 200 utilization imbalance, and may also reduce its thermal imbalance.

For example, in an embodiment of the invention, a first VMM 230 detects that a first partition 205 is overutilized and requests the load status 246 of a second partition 206, from a second VMM 231. The second VMM 231 reports the second partition 206 is underutilized and the first VMM 230 then dynamically migrates a first VM 221 executing in the first partition 205 to the second partition 206 for further execution. This migration brings the system 200 into a more balanced state in terms of both partition 205-206 utilization and thermal distribution among processor cores 210-212.

VMM 230-231 may alter the frequency at which it determines the load status 245 of a given partition 205 depending on the current or last reported load status 245 of that partition 205. For example, in one embodiment a VMM 230 determines that partition 205 is underutilized, and broadcasts to the other VMMs 230-231 on the system that partition 205 has excess processor core 210 capacity. It receives no response. VMM 230 then decreases the delay period of time 247 in the pre-determined criteria 250. VMM 230 then waits the prescribed delay period of time represented in the pre-determined criteria 250, which is a shorter period than the previous iteration, and broadcasts to the other VMMs 230-231 again.

A delay period of time 247 may also be employed to avoid thrashing. Depending on the configuration of the parameters in the pre-determined criteria, a delay period of time 247 may be implemented to cause VMs 220-221 to wait a period of time. This delay period of time may help a system 200 avoid thrashing by increasing the interval at which a VMM 230 broadcasts to other VMMs 230-231. Alternatively, the delay period of time 247 may be used to increase the time a VM selected to migrate 221 must wait until its migration is initiated. Trashing may be an undesirable state where a system 200 expends an increasing amount of computation cycles to complete a diminishing amount of work, thus degrading the overall system 200 performance.

For example, in one embodiment, a VM 221 is selected to migrate from partition 205 to partition 206. VMM 230-231 determines that the migration of the VM 221 must be delayed because a condition exists that matches the pre-determined criteria indicating system 200 thrashing. VMM 230-231 then executes a computer instruction 235 to delay the migration of the VM 221 from partition 205 to partition 206 for a period of time 247. After the delay period of time 247 passes, the VM migrates as normal.

Data 240 passed between VMMs may be load information about a VM, the load status 245-246 of a processor core 210-212, the load status 245-246 of a partition 205-206, requests to use partition resources 205-206 managed by another VMM 230-231, etc.

A communication channel 241 may include a memory component 242. The memory component 242 may be configured to allow one VMM 230-231 to write data 240 to the memory component 242 to be later retrieved by another VMM 230-231. The memory component 242 can be implemented via shared memory, or via a dedicated direct memory access (DMA) engine that transfers data 240 from one VMM 230-231 to another. Other types of memory components 242 may be used also. In one embodiment a communication channel 241 comprises a shared memory component 242, wherein data 240 is written to the shared memory component 242 by a first VMM 230 and is then retrieved by a second VMM 231.

A load status 245-246 may be calculated for a given processor core 210-212 or a specific partition 205-206. One way that a load status 246-246 may be calculated is to add the total load or usage of each VM 220-221 executing on a particular processor core 210-212 or partition 205-206, and then divide that value by the total available capacity of a particular processor core 210-212 or partition 205-206 respectively, resulting in a value of the current load status 245-246. The load status 245-246 may also be referred to as the "utilization" of a particular processor core 210-212 or partition 205-206. For example, in one embodiment of the invention, a processor core 210 has four VMs 220-221 executing thereon. The current loads are "10" for the first VM, "20" for the second VM, "30" for the third VM, and "40" for the fourth VM. The total capacity of the processor core 210 is "100." The load status 245 of processor 210 is calculated by adding the load of each of the executing VMs 220-221 on that processor core 210 yielding a total of "100" (10+20+30+40=100), and then dividing the total load by the total capacity of that processor core 210 which is "100." This results in a load status of "100/100=1.00" or "100%." The processor core 210 is "100%" utilized. In an alternative embodiment, partition 206 includes two processor cores 211-212, wherein each processor core 211-212 includes two VMs executing thereon. The current load of the VMs 220-221 is "5" for the first VM 220-221, "10" for the second VM 220-221, "15" for the third VM 220-221, and "20" for the fourth VM 220-221. The total capacity of the partition 206 is "200" ((processor core 211=100)+(processor core 212=100)=200). The load status 246 of partition 206 is calculated by adding the load of each of the executing VMs 220-221 on all processor cores 211-212 in partition 206 yielding a total of "50" (5+10+15+20=50), and then dividing the total load (total load is 50) by the total capacity of partition 206 (total capacity is 200). This results in a load status of "50/200=0.25" or "25%." Partition 206 is "25%" utilized, thus, has a load status 246 of "0.25" or "25%."

Pre-determined criteria 250 may comprise a partition 205-206 or processor core 210-212 underutilization threshold value, a partition 205-206 or processor core 210-212 overutilization threshold value, a group of categorization attributes 251, a per processor core 210-212 native task list, a per partition 205-206 native task list, a partition-to-total-capacity map, a processor core-to-total-capacity map, a VM 220-221 load map, a current-load-status-to-delay-time-period map, a per partition maximum-available-load-map, a per processor maximum-available-load-map, a per VM 220-221 minimum-required-load-value, a processor core 210-212 or partition 205-206 lower threshold, a processor core 210-212 or partition 205-206 upper threshold, a thrashing delay default value, a VM migration count value, a per VM migration limit default value. Pre-determined criteria 250 may also comprise a processor core temperature threshold, number of micro-operations retired threshold, cache misses threshold, branch mispredicts threshold and other micro-architectural threshold available from processor core counters or values within the system 200. The pre-determined criteria 250 may be any other data, value, or attribute to manipulate or configure the results of comparisons that the system 200 makes against the pre-determined criteria 250.

The pre-determined criteria 250 is dynamically configurable. The group of categorization attributes 251 may further comprise one or more categorization attributes such as VM access rights, VM priority, VM criticality, VM requestor, VM application type, VM OS type, VM user type, or any other categorization attribute of a VM 220-221. A VM 220-221 selected for migration may be compared with the categorization attributes 251 held in the pre-determined criteria 250 and either permitted to continue migrating, or be denied from migrating based on parameters held in the pre-determined criteria 250. The pre-determined criteria 250 may be encoded in hardware, software, firmware, or an any other medium accessible by the system 200 or apparatus 299.

In one embodiment, a VM 220-221 selected to migrate from partition 205 to partition 206 has a categorization attribute 251 of "VM requestor" with a value of "root." VMM 230 compares the categorization attribute 251 against the pre-determined criteria 250 which indicates that all VMs 220-221 may be migrated off partition 206 except those with a categorization attribute 251 of "VM requestor" whose value is "root" or "system" or "administrator." The VM 220-221 having a categorization attribute 251 that matches the pre-determined criteria 250 is denied from continuing its migration from partition 205 to partition 206.

In another embodiment a first VMM 230 is connected with partition 205. Partition 205 includes processor core 210. Partition 205 has a current load status 245 of "5%." The first VMM 230 compares the load status 245 of partition 205 against the pre-determined criteria 250 underutilization threshold, resulting in a "true" response, indicating that partition 205 is underutilized per the pre-determined criteria 250. The first VMM 230 then broadcasts a message (data 240) via the communication channel 241 to a second VMM 231 on the system 200. The second VMM 231 is connected with partition 206. Partition 206 includes processor core 211. Partition 206 has a current load status 246 of "99%." The second VMM 231 compares the load status 246 of partition 206 against the pre-determined criteria 250 overutilization threshold, resulting in a "true" response, indicating that partition 206 is overutilized per the pre-determined criteria 250. The second VMM 231 then responds with a message (data 240) via the communication channel 241 to the first VMM 230 on the system 200. The first VMM 230 detecting that partition 205 is underutilized and partition 206 is overutilized then selects a VM 221 to migrate from partition 205 to partition 206. The first VMM 230 next sends a migration request message (data 240) via the communication channel 241 indicating the VM 221 is to migrate. The second VMM 231 then receives the migration request message (data 240), and executes a computer instruction 235 initiating the migration process of VM 221 from partition 205 to partition 206. The migration results in a more balanced system 200 in terms of partition 205-206 utilization and thermal distribution.

The group of computer instructions 235 may be embodied in software, hardware, firmware, or processor core microcode. Computer instructions 235 may be updated dynamically by a user, a system administrator, manufacturer, software provider etc. Computer instructions 235 may be executed by a VMM 230-231 or handed off for execution by a VM 220-221, a partition 205-206, a processor core 210-212, or another resource 207-208. Computer instructions 235 are used to instruct the system 200 to perform a desired function, task, routine, operation, or logical step. Computer instructions 235 may also be used to compare data 240, statistics, attributes, or values against the pre-determined criteria to control the behavior of the system 200. A computer instruction 235 may comprise any number of inter-related computer operations intended to bring about a desired result. A Computer instruction 235 is not limited to a single computer operation.

Referring to FIGS. 2, 4A, and 4B: In one embodiment of the invention a computer instruction 235 determines the load status 245-246 of a processor core 210-212, or partition 205-206. In another embodiment, a computer instruction 235 determines the total execution capacity of a processor core 210-212 or partition 205-206. In an alternative embodiment, a computer instruction 235 determines the current execution load of an individual VM 220-221 (step 422 of FIG. 4B). In a further embodiment, a computer instruction 235 is used to perform the migration of a VM 220-221. In yet another embodiment, a computer instruction 235 is employed by the VMMs 230-231 to communicate with one another (steps 416, 422, 432, and 472). In one embodiment, a computer instruction 235 delays the migration of a VM 220-221 for a period of time 247 (step 460) and modifies the delay period of time 247 (step 458) based on the pre-determined criteria 250. In an alternative embodiment computer instructions 235 detect and quarantine a fault 283-284 exhibited by an application 281 or OS 282 executing on a VM 220-221. In one embodiment, a computer instruction 235 reboots a VM 220 without disrupting other VMs 220-221 executing on the system 200. In another embodiment, a computer instruction 235 compares an attribute of the system 200 with the pre-determined criteria 250 and returns a result. In a particular embodiment, a computer instruction 235 chooses a VM selection method (step 428) based on the pre-determined criteria 250, and then selects either a VM 221 with the largest minimum required load (MRL) as in step 462, or selects a VM 221 with the smallest minimum required load as in step 430 based on the pre-determined criteria 250. In another embodiment computer instructions 235 are used to select a processor core 210-212 or partition 205-206 that is most overloaded (step 420), and determines if any VMs 221 are able to migrate off (step 426) based by comparing the minimum required loads of potential VMs to migrate 220-221 against a processor core 210-212 or partition's 205-206 maximum available load (MAL) as in step 424.

A communication interface 260 to connect a system 200 with other systems 262 via a network 263 is sometimes referred to as a "network interface card (NIC)," "modem," "access card," "wireless card," or an "interface." A communication interface 260 may be of any type, including a hard or soft interface including Ethernet, coaxial, twisted pair, infrared, optical, Bluetooth, wireless, radio, InfiniBand, FCAL, serial, satellite, and any other type of interface that allows for communication of the system 200 with any number of other systems 262 on a network 263. For example, in one embodiment system 200 sends four data packets 261 to seven other network systems 262 via an Ethernet communication interface 260 over an Ethernet network 263. In another embodiment, system 200 is enabled to send a plurality of data packets 261 to other network systems 262 via a wireless communication interface 260 over a wireless network 263.

Thus, a system 200, apparatus 299, and methods 300-400 for dynamically load balancing a multi-partitioned system has been disclosed. Dynamically balancing execution loads may result in a better performing partitioned system through the more efficient distribution of execution load among the available processor cores in single or multiple partitions. Dynamically balancing execution loads may further result in better thermal distribution among a partitioned system due to processor cores operating at more evenly distributed levels. In accordance with an embodiment of the present invention, the multi-partitioned system comprises a first partition and a second partition, each of which include one or more VMs, wherein a VM migrates between the first partition and the second partition. It should be understood that although the details of the various embodiments disclosed herein are with respect to two partitions, more than two partitions may be used and are considered part of the present invention.

What is claimed is:

1. A method comprising:
hosting a plurality of partitions on a single computing apparatus, wherein each of the plurality of partitions is allocated a subset of processor cores within the computing apparatus without overlap or double assignment of any of the processor cores to more than one of the plurality of partitions;
executing one or more virtual machines within each of the plurality of partitions of the computing apparatus, wherein each virtual machine executes via the subset of processor cores assigned to the respective partition in which the one or more virtual machines operate;
determining a load status of the subset of processor cores allocated to a first partition among the plurality of partitions within the computing apparatus and comparing the load status of the first partition against an upper threshold for the first partition;
identifying a virtual machine among the one or more virtual machines executing on the subset of processor cores allocated to the first partition which is running a task not present on a native task list for the first partition;
migrating the virtual machine running the task which is not present on the native task list for the first partition to a different partition within the computing apparatus when the load status of the first partition exceeds the upper threshold for the first partition; and
repeating the determining, identifying, and migrating until the load status of the first partition is below the upper threshold for the first partition.

2. The method of claim 1:
wherein the first partition comprises a system partition to perform system tasks initiated on behalf of an end-user, rather than initiated directly by an end-user of the computing apparatus; and
wherein migrating the virtual machine to a different partition within the computing apparatus comprises migrating the virtual machine to a user partition that performs general computing tasks initiated directly by the end-user.

3. The method of computing of claim 1, further comprising:
modifying the frequency at which the load status of the first partition is determined based on a current load status of the first partition.

4. The method of claim 1, wherein migrating the virtual machine comprises the virtual machine:
executing in a first state of pre-migration, wherein the virtual machine is executing as normal;
executing in a second state of reservation, wherein the virtual machine is executing on the first partition and corresponds to a newly initialized virtual machine on the different partition;
executing in a third state of pre-copy, wherein available memory pages of the virtual machine are copied from the virtual machine to the newly initialized virtual machine;
executing in a fourth state of stop-and-copy, wherein the virtual machine stops execution and any memory pages of the virtual machine that are out of synchronization with the memory pages of the newly initialized virtual machine are copied and/or re-copied to the newly initialized virtual machine;
executing in a fifth state of commitment, wherein the virtual machine corresponding to the first partition is eliminated and the newly initialized virtual machine is then referred to as the virtual machine; and
executing in a sixth state of activation, wherein the virtual machine connects to local devices and resumes normal operation by entering into a first state of pre-migration executing from the different partition.

5. The method of claim 1, further comprising:
selecting the different partition from among a plurality of available partitions within the computing apparatus based on a comparison of load statuses for each of the respective plurality of available partitions.

6. The method of claim 1, further comprising:
selecting the different partition from among a plurality of available partitions within the computing apparatus based on a comparison of VM processor core temperatures for each of the respective plurality of available partitions.

7. The method of claim 1, wherein the computing apparatus comprises:
a first virtual machine monitor to manage the one or more virtual machines to execute on the first partition; and
a second virtual machine monitor to manage the one or more virtual machines to execute on the different partition.

8. A computing apparatus, comprising:
a plurality of partitions, wherein each partition is allocated a subset of processor cores of the computing apparatus without overlap or double assignment of the same processor cores to more than one of the partitions and wherein each partition includes one or more virtual machines to execute via the subset of processor cores assigned to the partition;
a first computer instruction to determine a load status of the subset of processor cores allocated to a first partition and compare the load status against an upper threshold for the first partition;
a second computer instruction to identify a virtual machine among the one or more virtual machines executing on the subset of processor cores allocated to the first partition that is running a task which is not present on a native task list for the first partition; and
a third computer instruction to migrate the virtual machine running the task which is not present on the native task list for the first partition to a second partition when the load status of the first partition exceeds the upper threshold for the first partition.

9. The computing apparatus of claim 8, wherein the computing apparatus further comprises:
a fourth instruction to select the second partition from among a plurality of available partitions based on a comparison of load statuses for each of the respective plurality of available partitions.

10. The computing apparatus of claim 8, wherein the computing apparatus further comprises:
a fourth instruction to select the second partition from among a plurality of available partitions based on a comparison of VM processor core temperatures for each of the respective plurality of available partitions.

11. The computing apparatus of claim 8, wherein the first partition comprises a system partition to perform system tasks initiated on behalf of an end-user and not initiated directly by the end-user, and wherein the second partition comprises a user partition to perform general tasks initiated directly by the end-user.

12. The computing apparatus of claim 8, wherein the computer instructions are encoded in hardware, or software, or firmware, or processor core micro-code, or a combination thereof.

13. The computing apparatus of claim 8, further comprising:
a virtual machine monitor to generate the computer instructions for execution on the computing apparatus.

14. The computing apparatus of claim 13, wherein the first virtual machine monitor to manage the one or more virtual machines to execute on the first partition, and further comprising:
a second virtual machine monitor to manage a second one or more virtual machines to execute on the second partition.

15. The computing apparatus of claim 14, further comprising:
a communication channel to connect the first virtual machine monitor with the second virtual machine monitor to exchange data corresponding with the first and second partitions; and
wherein the communication channel comprises either a shared memory component, or a direct memory access component, or both.

16. A computer-readable storage medium having instructions stored thereon that, when executed by a plurality of processor cores within a single computing apparatus, cause the computing apparatus to perform a method comprising:
hosting a plurality of partitions on the computing apparatus, wherein each of the plurality of partitions is allocated a subset of processor cores within the computing apparatus without overlap or double assignment of any of the processor cores to more than one of the plurality of partitions;
executing one or more virtual machines within each of the plurality of partitions of the computing apparatus, wherein each virtual machine executes via the subset of processor cores assigned to the respective partition in which the one or more virtual machines operate;
determining a load status of the subset of processor cores allocated to a first partition among the plurality of partitions within the computing apparatus and comparing the load status of the first partition against an upper threshold for the first partition;
identifying a virtual machine among the one or more virtual machines executing on the subset of processor cores allocated to the first partition which is running a task not present on a native task list for the first partition; and
migrating the virtual machine running the task which is not present on the native task list for the first partition to a different partition within the computing apparatus when the load status of the first partition exceeds the upper threshold for the first partition.

17. The computer-readable storage medium of claim 16:
wherein the first partition comprises a system partition to perform system tasks initiated on behalf of an end-user, rather than initiated directly by an end-user of the computing apparatus; and
wherein migrating the virtual machine to a different partition within the computing apparatus comprises migrating the virtual machine to a user partition that performs general computing tasks initiated directly by the end-user.

18. The computer-readable storage medium of claim 16, wherein the method further comprises selecting the different partition from among a plurality of available partitions within the computing apparatus based on a comparison of VM processor core temperatures for each of the respective subset of processor cores allocated to each of the plurality of available partitions.

19. The computer-readable storage medium of claim 16, wherein the computing apparatus comprises:
a virtual machine monitor to manage the one or more virtual machines executing in the first partition and the one or more virtual machines executing in the different partition.

20. The computer-readable storage medium of claim 16, wherein the computing apparatus comprises:

a first virtual machine monitor to manage the one or more virtual machines to execute on the first partition; and a second virtual machine monitor to manage a second one or more virtual machines to execute on the different partition, wherein the first virtual machine monitor and the second virtual machine monitor are connected via a communication channel having a shared memory component, and/or a direct memory access component to allow the first and second virtual machine monitors to exchange data corresponding to the first partition and the different partition.

* * * * *